Figure 1:
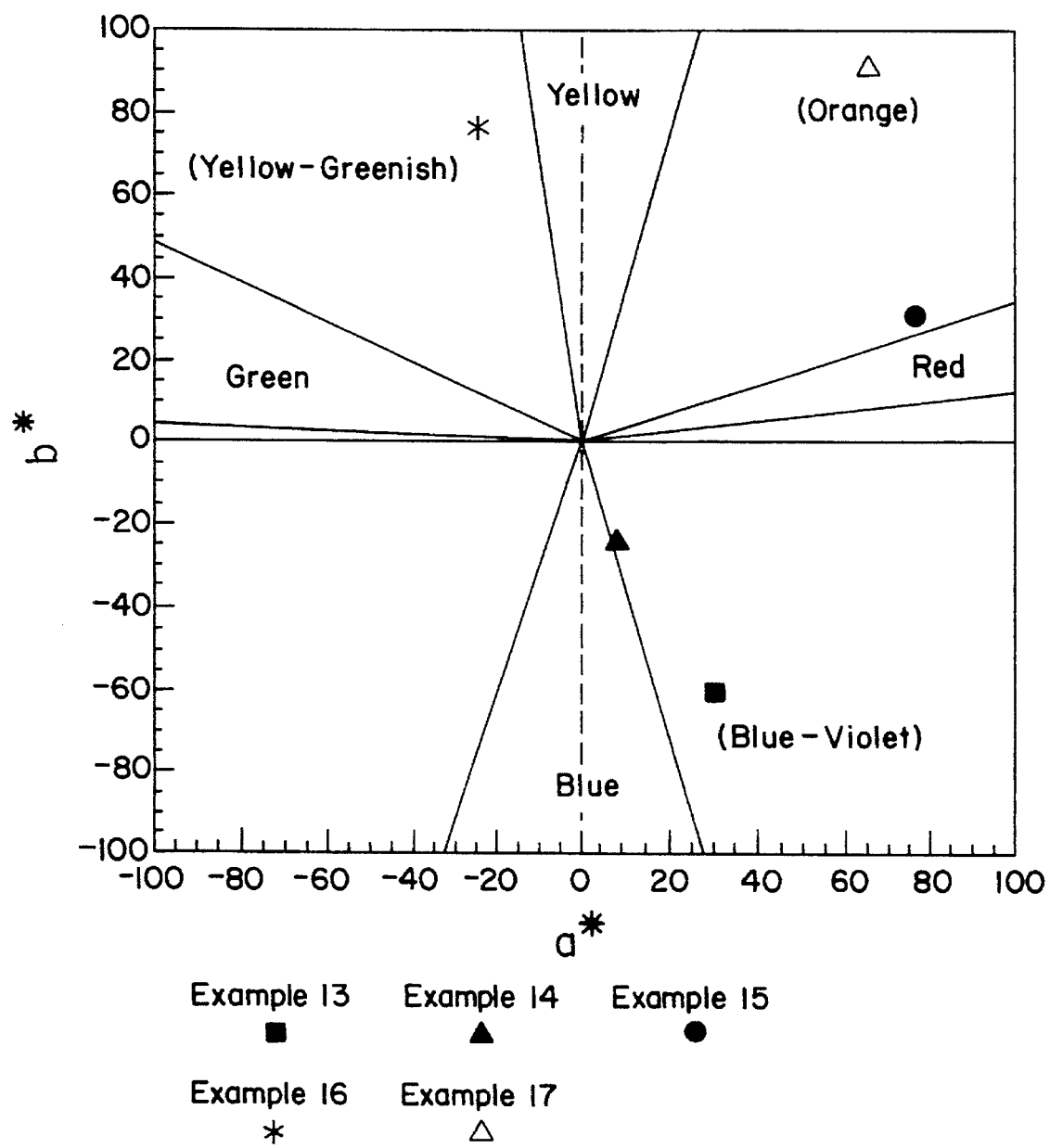

United States Patent [19]
Renzi et al.

[11] Patent Number: 5,599,876
[45] Date of Patent: Feb. 4, 1997

[54] COMPOSITION AND PROCEDURE FOR THE PREPARATION OF ORGANIC GLASSES

[75] Inventors: Fiorenzo Renzi, Gorgonzola; Claudio Gagliardi, San Donato Milanese; Franco Rivetti, Milan; Pietro Allegrini, San Donato Milanese, all of Italy

[73] Assignee: Enichem Synthesis S.p.A., Palermo, Italy

[21] Appl. No.: 143,940

[22] Filed: Oct. 27, 1993

[30] Foreign Application Priority Data

Oct. 30, 1992 [IT] Italy ................. MI92A2492

[51] Int. Cl.⁶ .................. C08K 5/357; C08F 18/16; C08F 4/36
[52] U.S. Cl. .................. 524/720; 526/232.3; 526/320
[58] Field of Search ................. 524/720; 526/232.3, 526/320

[56] References Cited

U.S. PATENT DOCUMENTS

| | | | |
|---|---|---|---|
| 3,578,602 | 5/1971 | Ono et al. | 252/600 |
| 4,215,010 | 7/1980 | Hovey et al. | 252/300 |
| 4,607,087 | 8/1986 | Moriya et al. | 526/227 |
| 5,196,492 | 3/1993 | Renzi et al. | 526/210 |

FOREIGN PATENT DOCUMENTS

| | | |
|---|---|---|
| 80339 | 6/1983 | European Pat. Off. . |
| 80338 | 6/1983 | European Pat. Off. . |
| 90627 | 10/1983 | European Pat. Off. . |
| 9012819 | 11/1990 | WIPO . |

*Primary Examiner*—Joseph L. Schofer
*Assistant Examiner*—Wu C. Cheng
*Attorney, Agent, or Firm*—George P. Hoare, Jr.; Rogers & Wells

[57] ABSTRACT

A polymerizable liquid composition includes
- a polymerizable poly(allyl carbonate) of an aliphatic or cyclo-aliphatic polyol;
- an organic peroxide generator of free radicals selected from the group of perketals, and possibly
- an organic dye and/or an organic photochromic compound.

The compositions can be transformed, by bulk polymerization, into an organic glass which is colorless, or colored or photochromic, having good optical and mechanical characteristics.

14 Claims, 4 Drawing Sheets

FIG. I

COMPOSITION AND PROCEDURE FOR THE PREPARATION OF ORGANIC GLASSES

The present invention relates to a liquid composition which can be polymerized via radicals into a colourless, coloured or photochromic organic glass having good optical and mechanical characteristics. The invention also relates to a procedure for the preparation of said organic glass and the organic glass thus obtained.

Various organic polymers are used in the art such as organic glass for the optical field. Among these polyacrylates, polycarbonate and polystyrene can be cited. However the organic glass which is of greatest commercial interest is produced by the polymerization of allyl carbonates of diols or polyols, as disclosed for example by F. Stein in "Encyclopedia of Chemical Processing and Design", Ist Ed , Dekker Inc , N.Y., Vol. II, page 452 and the following; "Encyclopedia of Polymer Science and Technology" Vol. I, Interscience Publishers, New York, 1964, page 799 and the following; and also in European patent No. 35.304.

An allyl carbonate which is widely used for the purpose is bis(allyl carbonate) of diethylene glycol, owing to the optical and mechanical characteristics of the polymerized products which make it useful for the production of ophthalmic and safety plates and lenses. However allyl carbonates of other aliphatic or cycloaliphatic diols and aliphatic polyols containing three or more hydroxyl groups in the molecule have also been used, with the aim of enhancing some of the characteristics of organic glasses, such as abrasion resistance and thermal stability, or of reducing water absorption, as described for example in U.S. Pat. Nos. 4,713,433 and 4,874,821 and in European patent application No. 321.057.

An organic glass is generally prepared by bulk polymerization of allyl carbonates, by the action of an initiator capable of generating free radicals under polymerization conditions, and it is known that the type of initiator used has a fundamental role. Consequently among the various groups of radicalic initiators currently available on the market, only a few are used industrially. Azo-derivatives, initiators of the peroxiketone type or hydroperoxides and peresters, such as ter-butyl perhexanoate, are totally ineffective or are not capable of bringing the degree of polymerization to sufficiently high levels, not even under conditions of high concentration.

Actually the industrial field almost exclusively uses initiators of the percarbonate type (for example di-isopropyl percarbonate, di-cyclo-hexyl percarbonate and di-sec.butyl percarbonate), which are soluble in allyl carbonates and ensure good characteristics of the polymeric products by a suitable choice of polymerizable allyl carbonates and polymerization conditions. The use of percarbonates however has various disadvantages and involves the use of particularly severe measures both in the storage and utilization steps. In particular storage temperatures are required which are lower than 0° C., or even lower than −15° C., as in the case of di-isopropyl percarbonate, the most widely used compound. The dissolution of percarbonates, which are crystalline solids, in allyl carbonates is a lengthy process, requiring several hours, especially in the case of allyl carbonates with a higher viscosity. Consequently to avoid the entry of air and humidity, which can impair the final characteristics of the polymerized products, the dissolution is normally carried out in an inert environment, or under vacuum, with a consequent increase in costs. Finally to obtain an organic glass with good characteristics it is necessary to use a rather high concentration of initiators, normally about 3–5% by weight of the polymerizable composition.

As an alternative to percarbonates, in some cases the use of di-benzoyl peroxide is advised, which has a higher storage temperature than percarbonates. Di-benzoyl peroxide is normally sold as a mixture with a desensitizer (water or phthalates) which is capable of reducing the danger of and sensitivity to shock. The presence of a desensitizer however presents problems of incompatibility with the polymer of allyl carbonate, with the possibility of impairing its optical characteristics. In addition di-benzoyl peroxide, because of its aromatic chemical nature, can affect the resistance to UV radiation of the polymer. In particular the polymerized products obtained with this kind of initiator, even if UV stabilizers are added, become evidently yellow after limited periods of exposure to UV rays.

From what is described above, it is evidently necessary to improve the polymerizable compositions based on allyl carbonates and the procedures for the production of an organic glass, in order to overcome the disadvantages of the known art mentioned above.

The possibility of introducing photochromic compounds into an organic glass to give photochromic characteristics to the glass itself is also known in the art. There are numerous substances known which have photochromic characteristics, belonging to different classes of both inorganic and organic compounds, as mentioned in the texts "Photochromism" by G. H. Brown (Ed.), Vol. III of the series Weissberger "Techniques of Organic Chemistry", Wiley Interscience New York (1971) and in "Photochromism. Molecules and Systems", by H. Durr and H. Bouas-Laurent (Ed.), Vol. 40 of the series "Studies in Organic Chemistry", Elsevier (1990). Among the photochromic compounds of an organic nature, those belonging to the classes of spiropyranes, spirooxazines, chromenes and fulgides are of industrial interest. Among these those belonging to the class of spirooxazines are particularly used, as these compounds combine a high photochromic activity and a better aging stability compared to other known organic photochromic compounds, as described, for example, by H. Durr in Angew. Chem. Int. Ed. Engl., Vol. 28 (1989) pages 413–431, and by N.Y.C. Chu, in chapter 24 of the text "Photochromsim Molecules and Systems", mentioned above.

The preparation of coloured organic glasses, using dyes which are mostly of an organic nature, is also known in the art.

In the case of organic glasses based on poly(allyl carbonates), the dye or photochromic compound is generally deposited in limited areas on the surface of or inside the preformed end-product (for example a lens) as described for example in U.S. Pat. No. 4,286,957 and in European patent application No. 141.407. There are various procedures used for the purpose which consist for example in an immersion of the organic glass in a solution of the dye or photochromic substance in a suitable organic solvent. Techniques similar to this are thermal transfer and transfer in a vapour phase of the dye or photochromic compound to the surface of the organic glass. Alternatively the dye or photochromic compound can be dispersed in paints or resins which are subsequently deposited in the form of a film on the organic glass. All these methods however are both laborious and costly. Moreover the dye or photochromic compound is present in thin layers and generally on the surface of the end-product, thus affecting its stability. It is known, in fact, that atmospheric oxygen, mainly in its activated forms, greatly contributes to degrading the dye and photochromic compound. Contact with atmospheric oxygen can be avoided by preparing layered glass composed of two layers of organic glass between which the dye or photochromic compound is inserted. It is evident however that this method is costly and laborious and that the end-products obtained, being composed of different materials stuck together with adhesives, tend to lose their structural unity or the positive characteristics of the organic glass.

A simple method for introducing a dye or photochromic compound into an organic glass consists in their insertion in bulk, by introducing them into the monomers subjected to polymerization. This technique produces acceptable results in preparing coloured or photochromic end-products from acrylic polymers, by casting (polymerization in a mould of mixtures of reactive monomer, polymerization initiator and dye or photochromic compound). When however a dye or photochromic compound is introduced into a polymerizable composition composed of an allyl carbonate of a polyol, such as bis(allyl carbonate) of diethylene glycol and a polymerization initiator, normally selected from diisopropyl percarbonate, dicyclohexyl percarbonate and dibenzoyl peroxide, and polymerization is then carried out by heating the resulting mixture, the articles obtained have a colouring or photochromic activity reduced to zero, probably owing to the degradation of the dye or photochromic compound caused by the peroxide present.

It is therefore desirable to have compositions based on allyl carbonates and procedures for the production of organic glasses, which can contain the dye or photochromic compound in bulk without the disadvantages of the known art described above.

It has now been found, according to the present invention, that allyl carbonates of polyols polymerize under the action of reduced quantities of perketalic polymerization initiators, producing organic glasses with good optical and mechanical characteristics. Perketals are compounds which are normally liquid and easily soluble in allyl carbonates. In addition they can be stored at relatively high temperatures (up to about 30° C.).

It has also been found that this polymerization takes place without any substantial degradation of an organic dye or organic photochromic compound introduced into the polymerizable composition. It is therefore possible to incorporate the organic dye or photochromic compound in bulk and to obtain coloured or photochromic organic glasses in an easy and convenient way.

It has finally been found that this bulk incorporation enhances the colour or photochromic characteristics of organic glass and the duration of the photochromic activity, with respect to organic glasses of the known art containing the dye or photochromic compound either on the surface or in limited areas of the glass.

In accordance with this, the first aspect of the present invention relates to a polymerizable liquid composition which can be polymerized, via radicals, into an organic glass, also coloured and/or photochromic, including a polymerizable allyl carbonate, a polymerization initiator capable of generating free radicals under polymerization conditions and possibly also a dye and/or photochromic compound, characterized in that:

(A) said polymerizable allyl carbonate is at least a poly-(allyl carbonate) of an aliphatic $C_3$–$C_{10}$ polyol, linear or branched, or of a cyclo-aliphatic $C_5$–$C_{16}$ polyol, said polyols containing from 2 to 6 hydroxyl groups in the molecule, said poly(allyl carbonates) being in the form of monomers or mixtures of monomer and relative oligomers;

(B) said polymerization initiator, generator of free radicals, is at least a compound selected from the group of perketals;

(C) said photochromic compound is at least an organic photochromic compound selected from the groups of spiropyranes, spiro-oxazines, chromenes and fulgides; and (D) said dye is at least an organic dye.

Component (A)

As stated above, the allyl carbonates which are suitable for the purposes of the present invention are poly(allyl carbonates) of aliphatic polyols containing from 3 to 10 carbon atoms in the linear or branched chain. Poly(allyl carbonates) of cyclo-aliphatic polyols containing from 5 to 16 carbon atoms in the molecule are also suitable for the purpose. These polyols may generally contain from 2 to 6 hydroxyl groups in the molecule and preferably from 2 to 4. It is also possible to use mixed poly(allyl carbonates) i.e. deriving from two or more polyols, which can be obtained by the mechanical mixing of poly(allyl carbonates) of single polyols, or directly by chemical reaction starting from diallyl carbonate and a mixture of polyols, as is described in more detail later on. Finally all these poly(allyl carbonates) can be in the form of a monomer, or a mixture of the monomer with the relative oligomers. In general poly(allyl carbonates) (A) are liquid products at room temperature, with a viscosity of 10 to 500 cst, measured at 25° C. and their oligomer content can vary within wide limits, for example from 0 to about 80% by weight.

In accordance with this, examples of poly(allyl carbonates) (A) are:

bis(allyl carbonates) of diols such as for example diethylene glycol, dipropylene glycol, triethylene glycol, tetraethylene glycol, 1,3-propandiol, 1,4-butandiol, 1,5-pentandiol, 1,6-hexandiol, neopentyl glycol, 3-methyl-1,5-pentandiol, 2-methyl-2-ethyl-1,3-propandiol, 2,2-diethyl-1,3-propandiol, 2,2,4-trimethyl-1,3-pentandiol, 1,4-diemthylolcyclohexane and 4,8-bis(hydroxymethyl)[5.2.1.0$^{2,6}$]tricyclodecane;

tris(allyl carbonates) of triols such as glycerol, trimethylolpropane and tris (hydroxyethyl) isocyanurate;

tetra(allyl carbonates) of pentaerythritol;

hexa(allyl carbonates) of dipentaerythritol;

mixed bis(allyl carbonates) of at least two diols selected from those listed above; and mixed poly(allyl carbonates) of at least one diol and at least one polyol selected from those listed above.

The following are preferred examples of poly (allyl carbonates) (A) suitable for the purposes of the present invention:

(i) bis(allyl carbonate) of diethylene glycol monomer or mixture of monomer and relative oligomers.

The bis (allyl carbonate) of diethylene glycol monomer can be defined with the formula:

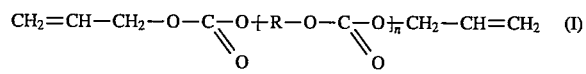

wherein R is the radical of diethylene glycol and n=1.

This compound can be prepared by the reaction of diethylenglycol bis(chloroformate) with allylic alcohol, as described for example in "Encyclopedia of Chemical Technology", Kirk-Othmer, Vol 2, pages 111–112.

Bis(allyl carbonate) of diethylene glycol, a mixture of monomer (n=1 in formula (I)) with one or more oligomers (n from 2 to about 10 in formula (I)), can be prepared both simply and conveniently by a transesterification reaction between diallyl carbonate and diethylene glycol, operating in the presence of a basic catalyst, as described for example in European patent 35.304. These mixtures monomer/oligomers can generally contain up to about 80% by weight of oligomers.

(ii) bis(allyl carbonate) of neopentyl glycol monomer or mixture of monomer and relative oligomers.

This bis(allyl carbonate) is similar to that of point (i) above, the diethylene glycol being substituted by neopentyl glycol.

(iii) mixed poly(allyl carbonate) of diethylene glycol and tris(hydroxyethyl) isocyanurate.

This poly(allyl carbonate) can be obtained by the transesterification of diallyl carbonate of a mixture of diethylene glycol and tris(hydroxyethyl) isocyanurate, as described for example in U.S. Pat. No. 4,812,545.

(iv) mixed poly(allyl carbonate) of neopentyl glycol and tris(hydroxyethyl) isocyanurate.

This poly (allyl carbonate) is similar to that of point (iii) above, the diethylene glycol being substituted by neopentyl glycol.

(v) mixed poly(allyl carbonate) of 1,4-butandiol and tris(hydroxyethyl) isocyanurate.

This poly (allyl carbonate) is similar to that of point (iii) above, the diethylene glycol being substituted by 1,4-butandiol.

(vi) mixed poly(allyl carbonate) of diethylene glycol and pentaerythritol, described for example in European patent application No. 302.537.

(vii) tris(allyl carbonate) of trimethylol propane, which can be obtained by the reaction of diallyl carbonate with trimethylol propane under transesterification conditions.

(viii) tetrakis(allyl carbonate) of pentaerythritol, which can be obtained by the reaction of diallyl carbonate with pentaerythritol under transesterification conditions.

Suitable transesterification conditions are described for example in European patent 35.304, cited above.

Component B.

The perketals used as polymerization initiators according to the present invention, are known compounds belonging to the group of gem-diperoxides:

wherein: R''' represents a tertiary alkyl group and preferably ter-butyl or ter-amyl; R' and R'' each independently represent an alkyl group, such as methyl, ethyl, propyl and butyl, said alkyl group possibly having non-interfering functional groups, such as for example an alkyl ester group at the extreme end of the chain; or R' and R'', together with the carbon atom to which they are linked, form a cyclo-alkylenic group and preferably a cyclohexylidenic group, possibly having one or more alkyl substituents and preferably from 1 to 3 methyl groups.

Examples of these gem-diperoxides are: 2,2-di(terbutyl peroxy) butane; n-butyl 4,4-di(ter-butyl peroxy) valerate; ethyl-3,3-di(ter-butyl peroxy)valerate; 1,1-di(ter-butyl peroxy) cyclohexane; and 1,1-di(ter-butyl peroxy) 3,3,5-trimethyl-cyclohexane.

Also suitable for the purpose are cyclic gem-diperoxides and cyclic gem-triperoxides, such as for example 3,3,6,6-tetramethyl-1,2,4,5-tetroxane; 3,6-diethyl-3,6-dimethyl-1,2,4,5-tetroxane; 7,8,15,16-tetraoxadispiro[5.2.5.2]hexadecane; and 3,3,6,6,9,9-hexamethyl 1,2,4,5-tetraoxycyclononane.

The perketal is present in the compositions of the present invention in a quantity of 0.5 to 5.0 parts, and preferably from 0.8 to 2.5 parts by weight, every 100 parts by weight of component (A).

Component (C).

Photochromic compounds which are suitable for the purposes of the present invention are selected from the groups of spiropyranes, spiro-oxazines, chromenes and fulgides. Apart from the literature previously cited, examples of spiropiranes are specified in the description of U.S. Pat. No. 3,100,778 and British patent 1.418.089; examples of spiro-oxazines are indicated in the description of U.S. Pat. Nos. 3,578,602, 4,215,010 and 4,342,668 and in European patent applications No. 134.633, 141.407, 146.135, 432.839 and 432.841; and examples of chromenes are indicated in the description of U.S. Pat. No. 3,567,605.

Among the above photochromic compounds those belonging to the class of spiro-oxazines and chromenes are preferred.

Preferred spiro-oxazines are those which can be defined with the formula:

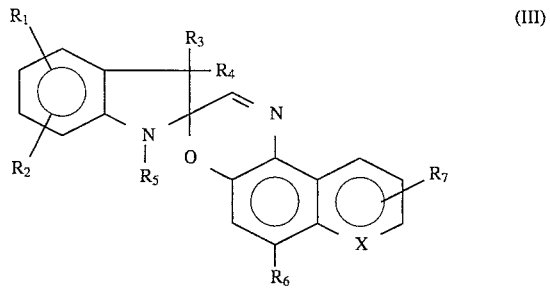

wherein:

$R_1$, $R_2$ each independently represent a hydrogen atom; a halogen atom (fluorine, chlorine or bromine); or a $C_1$–$C_5$ alkyl group linear or branched; $C_1$–$C_5$ alkoxy group; nitro or cyano group;

$R_3$ and $R_4$ each independently represent a $C_1$–$C_5$ alkyl group linear or branched; phenyl; or benzyl; or $R_3$ and $R_4$ together with the carbon atom to which they are linked form a $C_5$–$C_8$ cyclo-alkyl group;

$R_5$ represents a $C_1$–$C_5$ alkyl group linear or branched, or a similar alkyl group substituted with one or more hydroxy substituent groups, $C_1$–$C_5$ alkoxy or $C_1$–$C_5$ carboxyalkyl groups; phenyl; benzyl; or allyl;

$R_6$ represents a hydrogen atom; a $C_1$–$C_5$ alkyl group linear or branched; or the —$N_8R_9$ group, wherein $R_8$ represents a $C_1$–$C_5$ alkyl group linear or branched, phenyl, or benzyl, and $R_9$ represents the hydrogen atom, or has the same meaning as $R_8$, or $R_8$ and $R_9$, considered together with the nitrogen atom to which they are linked, form a cyclic structure with from 5 to 12 members, possibly containing a further hetero-atom in the chain selected from oxygen and nitrogen;

$R_7$ represents a hydrogen atom; a halogen atom (fluorine, chlorine or bromine), or a $C_1$–$C_5$ alkyl group linear or branched; a $C_1$–$C_5$ alkoxy group; a cyano group; a nitro group; a sulphide group; a carboxylate ester group with from 1 to 3 carbon atoms in the ester portion; a $C_1$–$C_5$ oxo-alkyl group or a oxo-aryl group; or $R_7$ represents an aromatic ring or a condensed heterocyclic ring; and X represents CH or N.

In particular when the $R_1$ and $R_2$ groups are different from the hydrogen atom, they can be linked in any of positions 4, 5, 6 and 7 of the indolinic part of the molecule. In addition when the group $R_7$ is different from the hydrogen atom or a condensed aromatic or heterocyclic ring, it can be present in any of the positions 7', 8', 9' and 10' of the naphthalene part of the molecule.

In the preferred embodiment photochromic compounds (III) are used where the substituents have the following meaning:

$R_1$ and $R_2$ independently represent the hydrogen atom or the methyl group;

$R_3$ and $R_4$ both represent the methyl group or jointly represent the cyclohexyl group;

$R_5$ represents the methyl group;

$R_6$ represents the hydrogen atom or the $-NR_8R_9$ group with groups $R_8$ and $R_9$ which, together with the nitrogen atom to which they are linked, form a structure having a piperidyl, morpholyl, pyrrolidyl or hexamethylenamine ring;

$R_7$ represents the hydrogen atom, a nitro group, or an oxomethyl, oxoethyl or oxyphenyl group; and X represents CH.

In addition, in the preferred embodiment, when the $R_1$ and $R_2$ groups are different from hydrogen, they are linked to portions 5 and 6 of the molecule.

Preferred chromenes are those which can be defined with the formula:

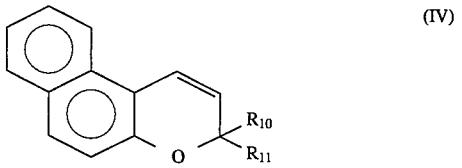

wherein $R_{10}$ and $R_{11}$ each independently represent a hydrogen atom, a $C_1$–$C_5$ alkyl linear or branched, a phenyl group, or a similar phenyl group substituted with from 1 to 5 halogen atoms (fluorine, chlorine or bromine), a cyclopropyl group, or $R_{10}$ and $R_{11}$ jointly represent a $C_5$ or $C_6$ alicyclic group or an adamantane group.

In the polymerizable liquid composition of the present invention component (C), when present, is used in a quantity of from 0.01 to 0.5 parts by weight and preferably in a quantity of about 0.05 parts by weight for every 100 parts by weight of component (A).

Component (D)

The organic dyes which can be used for colouring the organic glass, can belong to numerous chemical classes, such as for example acridine, anthraquinone, azine, monoazo, disazo, metallic azo complexes, perinone, benzoquinone, naphthoquinone, formazane, methine, naphthalamide, nitro, nitroso, phthalocyanine, quinacridone and stilbene. The preferred organic dyes of the present invention belong to the classes of anthraquinone, perinone, monoazo, disazo and phthalocyanine. Examples of commercial dyes used for the purpose are BLU ESTOFIL RR, ROSSO ESTOFIL BR and GIALLO ESTOFIL 2R (commercial products of Sandoz); SOLVAPERM RED BB, SOLVAPERM YELLOW G and SOLVAPERM BLUE B (commercial products of Hoechst). According to the suppliers, the dyes are of the monoazo, perinone or anthraquinone type.

In the polymerizable liquid composition of the present invention, component (D), when present, is used in a quantity of 0.005 to 0.1 parts by weight and preferably in a quantity of about 0.02 parts by weight every 100 parts by weight of component (A).

In a particular form of embodiment of the present invention a mixture of dyes and/or photochromic compounds are used, as components (C) and (D) to modify the shade of the optical items, for example, if necessary or desired, to bring the shade to grey or brown, which are preferred by the consumer in the field of optical items.

The polymerizable liquid composition may additionally contain one or more conventional additives such as light stabilizing sterically hindered amines (Hals), lubricants, UV, IR light absorbers and the like, in a global quantity however which does not exceed 1 part by weight for every 100 parts by weight of component (A).

A second aspect of the present invention relates to a procedure for the preparation of an organic glass, also coloured or photochromic, which consists in subjecting the above-defined polymerizable liquid composition to radical polymerization.

More specifically the casting technique is used which consists in pouring the polymerizable composition into a suitably shaped mould and heating it to a temperature within the range of 50° to 120° C., with polymerization times which generally range from 1 to 100 hours.

The use of perketals, according to the present invention, has various advantages with respect to both the process and to the characteristics of the organic glass obtained. In particular perketals can be stored without specific precautions and can be easily and rapidly dissolved in allyl carbonates (A). The polymerization of allyl carbonates (A) catalyzed by perketals allows the production of perfectly hardened polymerized products with good optical characteristics, and consequently of value in the production of optical items such as ophthalmic and safety plates and lenses.

In addition the advantages deriving from the bulk incorporation of the dye or photochromic compound, according to the present invention, are numerous with respect to the techniques of surface application:

firstly they represent a great technological simplification, allow a considerable decrease in process costs and an improvement in the production yields, owing to the elimination of the post-treatment operation of the preformed end-product;

in addition they ensure a good constancy and reproduction of the shade and intensity of colour, which cannot be achieved with the techniques involving surface application, as these strongly depend on the characteristics of the preformed end-product, such as its hardness;

finally, as it is evident in the experimental section which follows, the photochromic characteristics and duration of the photochromic activity (activation/deactivation process life) are considerably enhanced.

In the experimental examples which follow and which provide a further illustration of the invention, the following allyl carbonates (A) are used:

(A1) Reaction product of diallyl carbonate (DAC) and diethylene glycol (DEG) in a molar ratio between them of 12/1. The product thus obtained is a mixture of monomer and oligomers of bis(allyl carbonate) of diethylene glycol having the following composition:

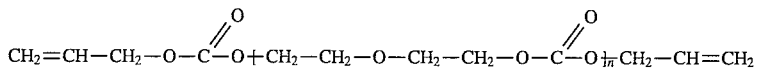

monomer (n=1) 88.3% by weight dimer (n=2) 10.5% by weight trimer (n=3) 1.1% by weight tetramer (n=4) 0.1% by weight Physical-chemical characteristics:

Viscosity, 25° C. (cst)=13.3

Density, 20° C. (g/ml)=1.1519

$n_D^{20}$=1.452

(A2) Reaction product of diallyl carbonate (DAC) and neopentylic glycol (NPG) in a molar ratio of 8/1. The product thus obtained is a mixture of monomer and oligomers of bis(allyl carbonate) of neopentyl glycol having the following composition:

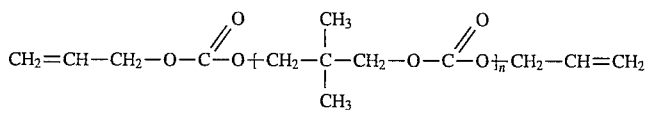

monomer (n=1) 82% by weight dimer (n=2) 15% by weight trimer (n=3) 2.4% by weight tetramer (n=4) 0.4% by weight Physical-chemical characteristics:

Viscosity, 25° C. (cst)=53

Density, 20° C. (g/ml)=1.096

$n_D^{20}$=1.4525

(A3) Reaction product of diallyl carbonate (DAC) with a mixture of diethylene glycol (DEG) and tris(hydroxyethyl) isocyanurate (THEIC) in the following proportions: DEG 70% by weight; THEIC 30% by weight; molar ratio DAC/(DEG+THEIC)=4/1.

The product thus obtained is a complex mixture containing:

bis(allyl carbonate) of diethylene glycol, monomer and oligomers, according to the formula indicated in (A1);

tris (allyl carbonate) of tris (hydroxyethyl) isocyanurate (monomer and oligomers):

(A4) Reaction product of diallyl carbonate (DAC) with a mixture of neopentyl glycol (NPG) and tris(hydroxyethyl) isocyanurate (THEIC) in the following proportions: NPG 70% by weight; THEIC 30% by weight; molar ratio DAC/(NPG+THEIC)=5/1.

The product thus obtained is a complex mixture containing:

bis(allyl carbonate) of neopentyl glycol, monomer and oligomers, according to the formula indicated in (A2);

tris(allyl carbonate) of tris(hydroxyethyl) isocyanurate, monomer and oligomers, according to the formula indicated in (A3); and mixed allyl carbonates of neopentyl glycol and tris(hydroxyethyl) isocyanurate.

Physical-chemical characteristics:

Viscosity, 25° C. (cst)=80

Density, 20° C. (g/ml)=1.1411

$n_D^{20}$=1.4595

(A5) Reaction product of diallyl carbonate (DAC) with a mixture of neopentyl glycol (NPG) and tris(hydroxyethyl) isocyanurate (THEIC) in the following proportions: NPG 50% by weight; THEIC 50% by weight; molar ratio DAC/(NPG+THEIC)=5/1.

The product thus obtained is a mixture similar to that indicated for (A4), having the following physical-chemical characteristics:

Viscosity, 25° C. (cst)=261

Density, 20° C. (g/ml)=1.1820

$n_D^{20}$=1.4680

(A6) Reaction product of diallyl carbonate (DAC) with a mixture of 1,4-butandiol (BD) and tris(hydroxyethyl) isocyanurate (THEIC) in the following proportions:

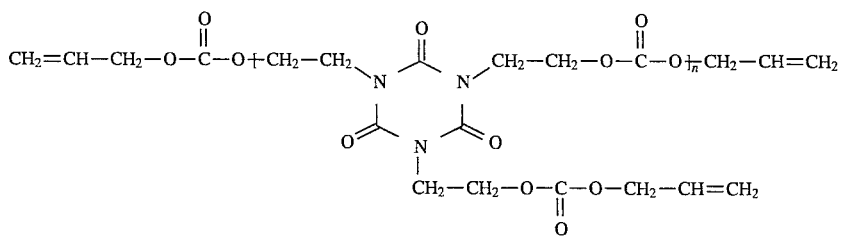

mixed allyl carbonates of diethylene glycol and tris(hydroxyethyl) isocyanurate.

Physical-chemical characteristics:

Viscosity, 25° C. (cst)=70

Density, 20° C. (g/ml)=1.2110

$n_D^{20}$=1.465

BD 70% by weight; THEIC 30% by weight; molar ratio DAC/(BD+THEIC)=4/1.

The product thus obtained is a complex mixture containing:

bis(allyl carbonate) of 1,4-butandiol (monomer and oligomers):

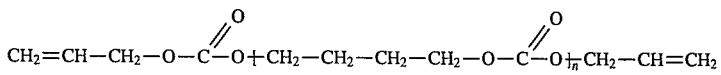

tris(allyl carbonate) of tris(hydroxyethyl) isocyanurate, monomer and oligomers, according to the formula indicated in (A3); and mixed allyl carbonates of 1,4-butandiol and tris(hydroxyethyl) isocyanurate.

Physical-chemical characteristics:

Viscosity, 25° C. (cst)=39

Density, 20° C. (g/ml)=1.1555

$n_D^{20}$=1.4592

(A7) Reaction product of diallyl carbonate (DAC) with a mixture of 1,4-butandiol (BD) and tris(hydroxyethyl) isocyanurate (THEIC) in the following proportions: BD 60% by weight; THEIC 40% by weight; molar ratio DAC/(BD+THEIC)=3/1.

The product thus obtained is a mixture similar to that indicated for (A6), having the following physical-chemical characteristics:

Viscosity, 25° C. (cst)=128

Density, 20° C. (g/ml)=1.1880

$n_D^{20}$=1.4658

(A8) Tris(allyl carbonate) of trimethylol propane, obtained by reacting diallyl carbonate and trimethylol propane in a molar ratio of 18/1.

This product, mainly monomeric, can be represented by the formula:

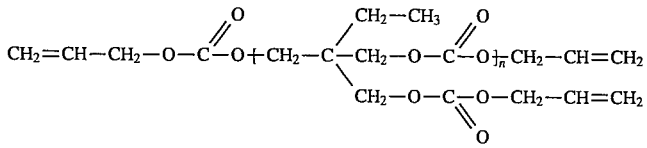

(A9) Tetrakis(allyl carbonate) of pentaerythritol, obtained by reacting diallyl carbonate and pentaerythritol in a molar ratio of 24/1.

This product, mainly monomeric, can be represented by the following formula:

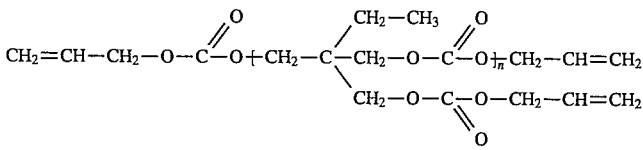

(A10) Reaction product of diallyl carbonate (DAC) with a mixture of neopentyl glycol (NPG), tris(hydroxyethyl) isocyanurate (THEIC) and pentaerythritol (PE) in the following proportions: NPG 70% by weight; THEIC 10% by weight; PE 20% by weight; molar ratio DAC/(NPG+THEIC+PE)=3/1.

The product thus obtained is a complex mixture of monomers and oligomers of allyl carbonates of the utilized polyols, having the following physical-chemical characteristics:

Viscosity, 25° C. (cst)=92

Density, 20° C. (g/ml)=1.1367

$n_D^{20}$=1.4579

(A11) Reaction product of diallyl carbonate (DAC) with a mixture of neopentyl glycol (NPG) and pentaery-thritol (PE) in the following proportions: NPG 70% by weight; PE 30% by weight; molar ratio DAC/(NPG+PE)=5/1.

The product thus obtained is a complex mixture of monomers and oligomers of allyl carbonates of the utilized polyols, having the following physical-chemical characteristics:

Viscosity, 25° C. (cst)=97.8

Density, 20° C. (g/ml)=1.1355

$n_D^{20}$=1.4575

In the experimental examples spiro-oxazines (C) are also used, which can be represented by the formula:

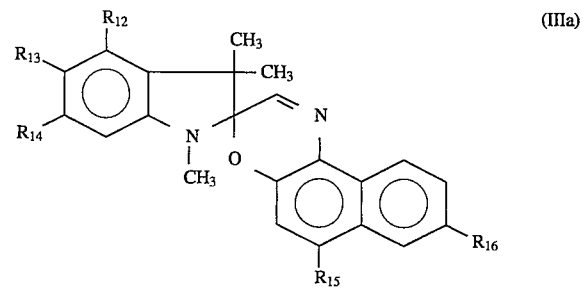

(C1) 1,3-dihydro-1,3,3-trimethyl-spiro[2H-indole-2,3'-[3H-naphtho-(2,1-b)-(1,4)oxazine]; corresponding to the formula (IIIa) wherein all the substituents from $R_{12}$ to $R_{16}$ are hydrogen;

(C2) mixture of 1,3-dihydro-1,3,3,4,5-pentamethyl-spiro [2H-indole-2,3'-[3H]-naphtho-(2,1-b)-(1,4)-oxazine], corresponding to the formula (IIIa) wherein $R_{12}$=$R_{13}$= —$CH_3$, the other substituents being hydrogen; and of 1,3-dihydro-1,3,3,5,6-pentamethyl-spiro[2H-indole-2, 3'-[3H]-naphtho-(2,1-b)-(1,4)-oxazine], corresponding to the formula (IIIa) wherein $R_{13}$=$R_{14}$=—$CH_3$, all the other substituents being hydrogen;

(C3) 1,3-dihydro-6'-piperidino-1,3,3-trimethyl-spiro[2H-indole-2,3'-[3H]-naphtho-(2,1-b) (1,4)-oxazine], corresponding to the formula (IIIa) wherein $R_{15}$=N-piperidyl, all the other substituents being hydrogen;

(C4) 1,3-dihydro-8'-oxophenyl-1,3,3-trimethyl-spiro[2H-indole-2,3'-[3H]-naphtho-(2,1-b)-(1,4) oxazine]; corresponding to the formula (IIIa) wherein $R_{16}$=—C(O)-phenyl, all the other substituents being hydrogen;

(C5) 1,3-dihydro-8'-nitro-1,3,3-triemthyl-spiro-[2H-indole-2,3'-[3H]-naphtho-(2,1-b)-(1,4)-oxazine]; corresponding to the formula (IIIa) wherein $R_{16}$=—$NO_2$, all the other substituents being hydrogen;

(C6) 1,3-dihydro-8'-oxoethyl-1,3,3-trimethyl-spiro-[2H-indole-2,3'-[3H]-naphtho-(2,1-b)-(1,4)-oxazine]; corresponding to the formula (IIIa) wherein $R_{16}$=—C(O)—$CH_2$–$CH_3$, all the other substituents being hydrogen.

In the experimental examples a chromene is also used.

(C7) 3,3-diphenyl-3H-naphtho[2,1-b]pyrane, having the following formula:

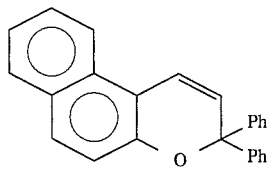

(IVa)

wherein Ph=phenyl

In experimental examples 1 to 12 photochromic lenses are prepared operating in the following way.

The polymerizable liquid compositions are prepared by mixing and homogenizing allyl carbonate (A), perketal 1,1-di(ter-butylperoxy)-3,3,5-trimethyl cyclohexane (component B) in the quantity indicated in the examples and photochromic compound (C), again in the quantity indicated in the examples. The compositions thus obtained are transformed by polymerization into lenses having a thickness of 2 mm, using the conventional casting technique. According to this technique the liquid composition containing the catalyst is poured into the cavities of a mould composed of two glass elements, with a spacing seal of plasticized polyvinyl chloride or copolymer of ethylene-vinyl acetate (EVA). The liquid composition is polymerized in the mould by thermal treatment carried out for 5 hours at 85° C. plus 15 hours at 90° C. and a further 7 hours at 100° C., in an oven with forced circulation. At the end of this treatment, the moulds are opened, the polymerized products are removed and the following characteristics are determined on the photochromic lenses thus obtained:

Rockwell Hardness (scale M), according to the method ASTM D-785;

Photochromic properties, determined by recording the visible UV spectra at 23° C. in the activated and deactivated forms, with an HP 8452 A (activation by exposure for 60 seconds to a UVA lamp; irradiance 9 W/$m^2$). The following characteristics of deactivated and activated forms are registered:

a) O.D. ($lambda_{max}$ UVA) and O.D. ($lambda_{max}$ vis.): Optical Density values at the wavelenght of the maximum absorption of the UV and visible portions respectively.

b) Y: tristimulus colorimetry value which indicates the Luminous Transmittance value in the visible region, as defined in Regulation CIE 1931 (this is obtained by the mathematical elaboration of the absorption spectra of the two forms, activated and deactivated).

c) Photochromic Activity: expressed as delta O.D. ($lambda_{max}$ vis.), difference of O.D. at $lambda_{max}$ in the visible region between activated and deactivated forms and as delta Y, difference between the Y Luminous Transmittance values.

Resistance to fatigue, determined with an Atlas Weather-O-Meter (WOM) equipped with a Xenon 6,500 W lamp (continuous radiation), operating at a temperature of 63° C. on a black reference panel and at a relative humidity of 50%. The aging resistance is determined by measuring, after various periods of exposure in WOM the residuous values of photochromic activity.

EXAMPLE 1

A composition containing 97.5% by weight of allyl carbonate A4 and 2.5% by weight of 1,1-di(terbutylperoxy)-3,3,5-trimethyl cyclohexane is prepared. A quantity of 0.1% by weight of photochromic compound C3 is added to the composition and polymerization is carried out under the conditions previously indicated. Lenses are obtained with a Rockwell hardness equal to 90 (M), and with the following photochromic characteristics:

| Deactivated state | |
|---|---|
| O.D. ($lambda_{max}$ UVA) | 2.551 (362 nm) |
| O.D. ($lambda_{max}$ vis.) | 0.108 (572 nm) |
| Y, 23° C. | 77.8 |
| Activated state | |
| O.D. ($lambda_{max}$ vis.) | 0.682 (572 nm) |
| Y, 23° C. | 33.6 |
| delta O.D. ($lambda_{max}$ vis.) | 0.574 (572 nm) |
| delta Y | 44.2 |

The fatigue resistance by exposure in WOM for up to 150 hours produces the following results:

| Exposure time | 50 hrs | 100 hrs | 150 hrs |
|---|---|---|---|
| delta O.D. ($lambda_{max}$ vis.) residual (572 nm) | 0.241 | 0.155 | 0.087 |
| delta Y, 23° C., residual | 29.3 | 17.6 | 11.1 |

EXAMPLE 2

A composition containing 97.5% by weight of allyl carbonate A4 and 2.5% by weight of 1,1-di(terbutylperoxy)-3,3,5-trimethyl cyclohexane is prepared. A quantity of 0.1% by weight of photochromic compound C1 is added to the composition and polymerization is carried out under the conditions previously indicated. Lenses are obtained with a Rockwell hardness equal to 86 (M), and with the following photochromic characteristics:

| Deactivated state | |
|---|---|
| O.D. ($lambda_{max}$ UVA) | 2.808 (344 nm) |
| O.D. ($lambda_{max}$ vis.) | 0.050 (598 nm) |
| Y, 23° C. | 76.0 |
| Activated state | |
| O.D. ($lambda_{max}$ vis.) | 0.316 (598 nm) |
| Y, 23° C. | 50.9 |
| delta O.D. ($lambda_{max}$ vis.) | 0.266 (598 nm) |
| delta Y | 25.1 |

The fatigue resistance by exposure in WOM for up to 150 hours produces the following results:

| Exposure time | 50 hrs | 100 hrs | 150 hrs |
| --- | --- | --- | --- |
| delta O.D. ($lambda_{max.}$ vis.) residual (600 nm) | 0.267 | 0.244 | 0.250 |
| delta Y, 23° C., residual | 25.4 | 26.2 | 24.5 |

EXAMPLE 3

A composition containing 97.5% by weight of allyl carbonate A4 and 2.5% by weight of 1,1-di(terbutylperoxy)-3,3,5-trimethyl cyclohexane is prepared. A quantity of 0.1% by weight of photochromic compound C2 is added to the composition and polymerization is carried out under the conditions previously indicated. Lenses are obtained with a Rockwell hardness equal to 91 (M), and with the following photochromic characteristics:

| Deactivated state | |
| --- | --- |
| O.D. ($lambda_{max}$ UVA) | 3.203 (348 nm) |
| O.D. ($lambda_{max.}$ vis.) | 0.063 (610 nm) |
| Y, 23° C. | 73.8 |
| Activated state | |
| O.D. ($lambda_{max.}$ vis.) | 0.386 (610 nm) |
| Y, 23° C. | 44.7 |
| delta O.D. ($lambda_{max.}$ vis.) | 0.323 (610 nm) |
| delta Y | 25.1 |

The fatigue resistance by exposure in WOM for up to 150 hours produces the following results:

| Exposure time | 50 hrs | 100 hrs | 150 hrs |
| --- | --- | --- | --- |
| delta O.D. ($lambda_{max.}$ vis.) residual (610 nm) | 0.263 | 0.235 | 0.225 |
| delta Y, 23° C., residual | — | 21.0 | 20.6 |

EXAMPLE 4

A composition containing 97.5% by weight of allyl carbonate A4 and 2.5% by weight of 1,1-di(terbutylperoxy)-3,3,5-trimethyl cyclohexane is prepared. A quantity of 0.1% by weight of photochromic compound C3 and 0.2% by weight of the commercial HALS stabilizer UVASIL 299 are added to the composition and polymerization is carried out under the conditions previously indicated. Lenses are obtained with a Rockwell hardness equal to 90.5 (M), and with the following photochromic characteristics:

| Deactivated state | |
| --- | --- |
| O.D. ($lambda_{max}$ UVA) | 2.793 (360 nm) |
| O.D. ($lambda_{max.}$ vis.) | 0.125 (574 nm) |
| Y, 23° C. | 75.4 |
| Activated state | |
| O.D. ($lambda_{max.}$ vis.) | 0.995 (574 nm) |
| Y, 23° C. | 23.6 |
| delta O.D. ($lambda_{max.}$ vis.) | 0.870 (574 nm) |
| delta Y | 51.8 |

The fatigue resistance by exposure in WOM for up to 150 hours produces the following results:

| Exposure time | 50 hrs | 100 hrs | 150 hrs |
| --- | --- | --- | --- |
| delta O.D. ($lambda_{max.}$ vis.) residual (572 nm) | 0.402 | 0.250 | 0.223 |
| delta Y, 23° C., residual | 33.0 | 23.3 | 19.0 |

EXAMPLE 5

A composition containing 97.5% by weight of allyl carbonate A4 and 2.5% by weight of 1,1-di(terbutylperoxy)-3,3,5-trimethyl cyclohexane is prepared. A quantity of 0.1% by weight of photochromic compound C3 and 0.2% by weight of the HALS stabilizer 2,2,6,6-tetramethyl piperidin-4-ol are added to the composition and polymerization is carried out under the conditions previously indicated. Lenses are obtained with a Rockwell hardness equal to 90 (M), and with the following photochromic characteristics:

| Deactivated state | |
| --- | --- |
| O.D. ($lambda_{max}$ UVA) | 2.774 (362 nm) |
| O.D. ($lambda_{max.}$ vis.) | 0.114 (572 nm) |
| Y, 23° C. | 77.1 |
| Activated state | |
| O.D. ($lambda_{max.}$ vis.) | 0.853 (572 nm) |
| Y, 23° C. | 28.1 |
| delta O.D. ($lambda_{max.}$ vis.) | 0.739 (572 nm) |
| delta Y | 49.0 |

The fatigue resistance by exposure in WOM for up to 150 hours produces the following results:

| Exposure time | 50 hrs | 100 hrs | 150 hrs |
| --- | --- | --- | --- |
| delta O.D. ($lambda_{max.}$ vis.) residual (570 nm) | 0.738 | 0.365 | 0.282 |
| delta Y, 23° C., residual | 31.2 | 26.4 | 19.9 |

EXAMPLE 6

A composition containing 99% by weight of allyl carbonate A4 and 1.0% by weight of 1,1-di(terbutylperoxy)-3,3,5-trimethyl cyclohexane is prepared. A quantity of 0.1% by weight of photochromic compound C3 is added to the composition and polymerization is carried out under the conditions previously indicated. Lenses are obtained with a Rockwell hardness equal to 86 (M), and with the following photochromic characteristics:

| Deactivated state | |
| --- | --- |
| O.D. ($lambda_{max}$ UVA) | 3.159 (362 nm) |
| O.D. ($lambda_{max.}$ vis.) | 0.116 (572 nm) |
| Y, 23° C. | 77.0 |
| Activated state | |
| O.D. ($lambda_{max.}$ vis.) | 0.996 (572 nm) |
| Y, 23° C. | 24.2 |
| delta O.D. ($lambda_{max.}$ vis.) | 0.880 (572 nm) |
| delta Y | 52.8 |

The fatigue resistance by exposure in WOM for up to 150 hours produces the following results:

| Exposure time | 60 hrs | 100 hrs | 150 hrs |
|---|---|---|---|
| delta O.D. (lambda$_{max.}$ vis.) residual (572 nm) | 0.488 | 0.424 | 0.416 |
| delta Y, 23° C., residual | 37.6 | 35.8 | 35.0 |

EXAMPLE 7

A composition containing 99% by weight of allyl carbonate A7 and 1.0% by weight of 1,1-di(terbutylperoxy)-3,3,5-trimethyl cyclohexane is prepared. A quantity of 0.1% by weight of photochromic compound C3 is added to the composition and polymerization is carried out under the conditions previously indicated. Lenses are obtained with a Rockwell hardness equal to 76 (M), and with the following photochromic characteristics:

| Deactivated state | |
|---|---|
| O.D. (lambda$_{max}$ UVA) | 3.142 (364 nm) |
| O.D. (lambda$_{max.}$ vis.) | 0.121 (572 nm) |
| Y, 23° C. | 76.1 |
| Activated state | |
| O.D. (lambda$_{max.}$ vis.) | 1.010 (572 nm) |
| Y, 23° C. | 23.5 |
| delta O.D. (lambda$_{max.}$ vis.) | 0.889 (572 nm) |
| delta Y | 52.6 |

The fatigue resistance by exposure in WOM for up to 150 hours produces the following results:

| Exposure time | 60 hrs | 100 hrs | 150 hrs |
|---|---|---|---|
| delta O.D. (lambda$_{max.}$ vis.) residual (572 nm) | 0.447 | 0.328 | 0.286 |
| delta Y, 23° C., residual | 34.1 | 28.5 | 25.7 |

EXAMPLE 8

A composition containing 99% by weight of allyl carbonate A3 and 1.0% by weight of 1,1-di(terbutylperoxy)-3,3,5-trimethyl cyclohexane is prepared. A quantity of 0.1% by weight of photochromic compound C3 is added to the composition and polymerization is carried out under the conditions previously indicated. Lenses are obtained with a Rockwell hardness equal to 80.5 (M), and with the following photochromic characteristics:

| Deactivated state | |
|---|---|
| O.D. (lambda$_{max}$ UVA) | 2.672 (378 nm) |
| O.D. (lambda$_{max.}$ vis.) | 0.111 (574 nm) |
| Y, 23° C. | 77.9 |
| Activated state | |
| O.D. (lambda$_{max.}$ vis.) | 0.630 (574 nm) |
| Y, 23° C. | 36.7 |
| delta O.D. (lambda$_{max.}$ vis.) | 0.519 (574 nm) |
| delta Y | 41.2 |

EXAMPLE 9

A composition containing 97.5% by weight of allyl carbonate A5 and 2.5% by weight of 1,1-di(terbutylperoxy)-3,3,5-trimethyl cyclohexane is prepared. A quantity of 0.1% by weight of photochromic compound C7 is added to the composition and polymerization is carried out under the conditions previously indicated. Lenses are obtained with a Rockwell hardness equal to 95 (M), and with the following photochromic characteristics:

| Deactivated state | |
|---|---|
| O.D. (lambda$_{max}$ UVA) | 1.341 (360 nm) |
| O.D. (lambda$_{max.}$ vis.) | 0.341 (412 nm) |
| Y, 23° C. | 90.1 |
| Activated state | |
| O.D. (lambda$_{max.}$ vis.) | 1.026 (412 nm) |
| Y, 23° C. | 82.8 |
| delta O.D. (lambda$_{max.}$ vis.) | 0.685 (412 nm) |
| delta Y | 7.3 |

The fatigue resistance by exposure in WOM for up to 150 hours produces the following results:

| Exposure time | 50 hours | 115 hours |
|---|---|---|
| delta O.D. (lambda$_{max.}$ vis.) residual | 0.567 (412 nm) | 0.495 (430 nm) |
| delta Y, 23° C., residual | 7.0 | 5.7 |

EXAMPLE 10

A composition containing 97.5% by weight of allyl carbonate A5 and 2.5% by weight of 1,1-di(terbutylperoxy)-3,3,5-trimethyl cyclohexane is prepared. A quantity of 0.06% by weight of photochromic compound C4 is added to the composition and polymerization is carried out under the conditions previously indicated. Lenses are obtained with a Rockwell hardness equal to 94 (M), and with the following photochromic characteristics:

| Deactivated state | |
|---|---|
| O.D. (lambda$_{max}$ UVA) | 2.969 (340 nm) |
| O.D. (lambda$_{max.}$vis.) | 0.062 (614 nm) |
| Y, 23° C. | 62.5 |
| Activated state | |
| O.D. (lambda$_{max.}$vis.) | 0.868 (614 nm) |
| Y, 23° C. | 25.2 |
| delta O.D. (lambda$_{max.}$vis.) | 0.806 (614 nm) |
| delta Y | 37.3 |

EXAMPLE 11

A composition containing 97.5% by weight of allyl carbonate A5 and 2.5% by weight of 1,1-di(terbutylperoxy)-3,3,5-trimethyl cyclohexane is prepared. A quantity of 0.06% by weight of photochromic compound C5 is added to the composition and polymerization is carried out under the conditions previously indicated. Lenses are obtained with a Rockwell hardness equal to 94 (M), and with the following photochromic characteristics:

| Deactivated state | |
|---|---|
| O.D. (lambda$_{max}$ UVA) | 1.661 (330 nm) |
| O.D. (lambda$_{max}$.vis.) | 0.066 (612 nm) |
| Y, 23° C. | 72.6 |
| Activated state | |
| O.D. (lambda$_{max}$.vis.) | 0.195 (612 nm) |
| Y, 23° C. | 60.6 |
| delta O.D. (lambda$_{max}$.vis.) | 0.129 (612 nm) |
| delta Y | 12.0 |

EXAMPLE 12

A composition containing 97.5% by weight of allyl carbonate A5 and 2.5% by weight of 1,1-di(terbutylperoxy)-3,3,5-trimethyl cyclohexane is prepared. A quantity of 0.06% by weight of photochromic compound C6 is added to the composition and polymerization is carried out under the conditions previously indicated. Lenses are obtained with a Rockwell hardness equal to 92 (M), and with the following photochromic characteristics:

| Deactivated state | |
|---|---|
| O.D. (lambda$_{max}$ UVA) | 2.904 (334 nm) |
| O.D. (lambda$_{max}$.vis.) | 0.070 (614 nm) |
| Y, 23° C. | 63.2 |
| Activated state | |
| O.D. (lambda$_{max}$.vis.) | 0.762 (614 nm) |
| Y, 23° C. | 28 |
| delta O.D. (lambda$_{max}$.vis.) | 0.692 (614 nm) |
| delta Y | 35.2 |

In experimental examples 13 to 27 coloured lenses are prepared operating in the following way.

The polymerizable liquid compositions are prepared by mixing and homogenizing allyl carbonate (A), perketal 1,1-di(ter-butylperoxy)-3,3,5-trimethylcyclohexane (component B) in the quantity indicated in the examples and dye (D), again in the quantity specified in the examples. The compositions are transformed by polymerization into lenses with a thickness of 2 mm or 3 mm using the conventional casting technique. The liquid composition is polymerized by thermal treatment, carried out in an oven with forced circulation, according to the following program: 85° C. for 5 hours, 90° C. for 15 hours and 100° C. for 7 hours. At the end of this treatment the moulds are opened, the polymerized products are recovered and the following characteristics are determined on the lenses thus obtained:

Transmittance in the visible range (%): measured using a Gardner Hazegard XL-211 apparatus (ASTM D-1003);

Rockwell Hardness (M) measured with a Rockwell durometer (ASTM D-785);

colour, expressed with colorimetric values L*, a* and b*, according to Regulation CIE 1976. The measurement is carried out using a MACBETH 1500 PLUS spectrophotometer under the following measurement conditions: illuminant source type C/2°; specularity excluded; UV excluded.

EXAMPLES 13-20

A composition containing 97.5% by weight of allyl carbonate A5 and 2.5% by weight of 1,1-di(terbutylperoxy)-3,3,5-trimethyl cyclohexane is prepared. The following dyes mentioned by their commercial names are added to the composition, in the quantities indicated, expressed in percentage by weight of the composition itself:

example 13: BLU ESTOFIL RR, 0.025%;
example 14: SOLVAPERM BLUE B, 0.025%;
example 15: SOLVAPERM RED BB, 0.025%;
example 16: GIALLO ESTOFIL 2R, 0.050%;
example 17: ROSSO ESTOFIL BR, 0.050%;
example 18: BLU ESTOFIL RR, 0.015%;
example 19: GIALLO ESTOFIL 2R; 0.050%;
example 20: SOLVAPERM RED BB, 0.020%.

Polymerization is carried out under the conditions described above and lenses are produced having a thickness of 3 mm (examples 13-17) or 2 mm (examples 18-20) and the characteristics indicated in the following table are determined on the lenses.

| Es.No | Hardness | Transmit. (%) | L* | a* | b* |
|---|---|---|---|---|---|
| 13 | 111 | 8.7 | 34.6 | 30.1 | -61.1 |
| 14 | 110 | 4.6 | 24.4 | 7.9 | -24.9 |
| 15 | 111 | 20.3 | 51.8 | 75.9 | 30.7 |
| 16 | 111 | 89.1 | 95.3 | -24.9 | 76.4 |
| 17 | 111 | 22.8 | 53.5 | 64.8 | 98.3 |
| 18 | 103 | 33.6 | 64.2 | 5.4 | -39.8 |
| 19 | 108 | 89.7 | 95.2 | -24.6 | 72.3 |
| 20 | 109 | 24.1 | 60.1 | 73.8 | 2.3 |

EXAMPLES 21-23

A composition containing 97.5% by weight of allyl carbonate A1 and 2.5% by weight of 1,1-di(terbutylperoxy)-3,3,5-trimethyl cyclohexane is prepared. The following dyes mentioned by their commercial names are added to the composition, in the quantities indicated, expressed in percentage by weight of the composition itself:

example 21: BLU ESTOFIL RR, 0.015%;
example 22: GIALLO ESTOFIL 2R, 0.050%;
example 23: SOLVAPERM RED BB, 0.020%.

Polymerization is carried out under the conditions described above and lenses having a thickness of 2 mm are produced and the characteristics shown in the table below are determined on the lenses.

| Es.No | Hardness | Transmit. (%) | L* | a* | b* |
|---|---|---|---|---|---|
| 21 | 86 | 46.3 | 71.8 | -2.2 | -18.0 |
| 22 | 85 | 90.3 | 94.5 | -23.9 | 67.8 |
| 23 | 85 | 46.4 | 70.6 | 46.8 | -3.5 |

EXAMPLES 24-27

A composition containing 98.5% by weight of allyl carbonate A3 and 1.5% by weight of 1,1-di(terbutylperoxy)-3,3,5-trimethyl cyclohexane is prepared. The following dyes mentioned by their commercial names are added to the composition, in the quantities indicated, expressed in percentage by weight of the composition itself:

example 24: BLU ESTOFIL RR, 0.015%;
example 25: GIALLO ESTOFIL 2R, 0.050%;
example 26: SOLVAPERM RED BB, 0.020%.
example 27: SOLVAPERM YELLOW G, 0.050%.

Polymerization is carried out under the conditions described above and lenses having a thickness of 2 mm are produced and the characteristics shown in the table below are determined on the lenses.

| Es.No | Hardness | Transmit. (%) | L* | a* | b* |
|---|---|---|---|---|---|
| 24 | 90 | 29.9 | 62.3 | 1.5 | −34.9 |
| 25 | 94 | 89.9 | 95.3 | −24.6 | 70.7 |
| 26 | 90 | 32.5 | 63.0 | 69.6 | −4.1 |
| 27 | 84 | 84.3 | 93.1 | −18.5 | 99.6 |

Figure 2:
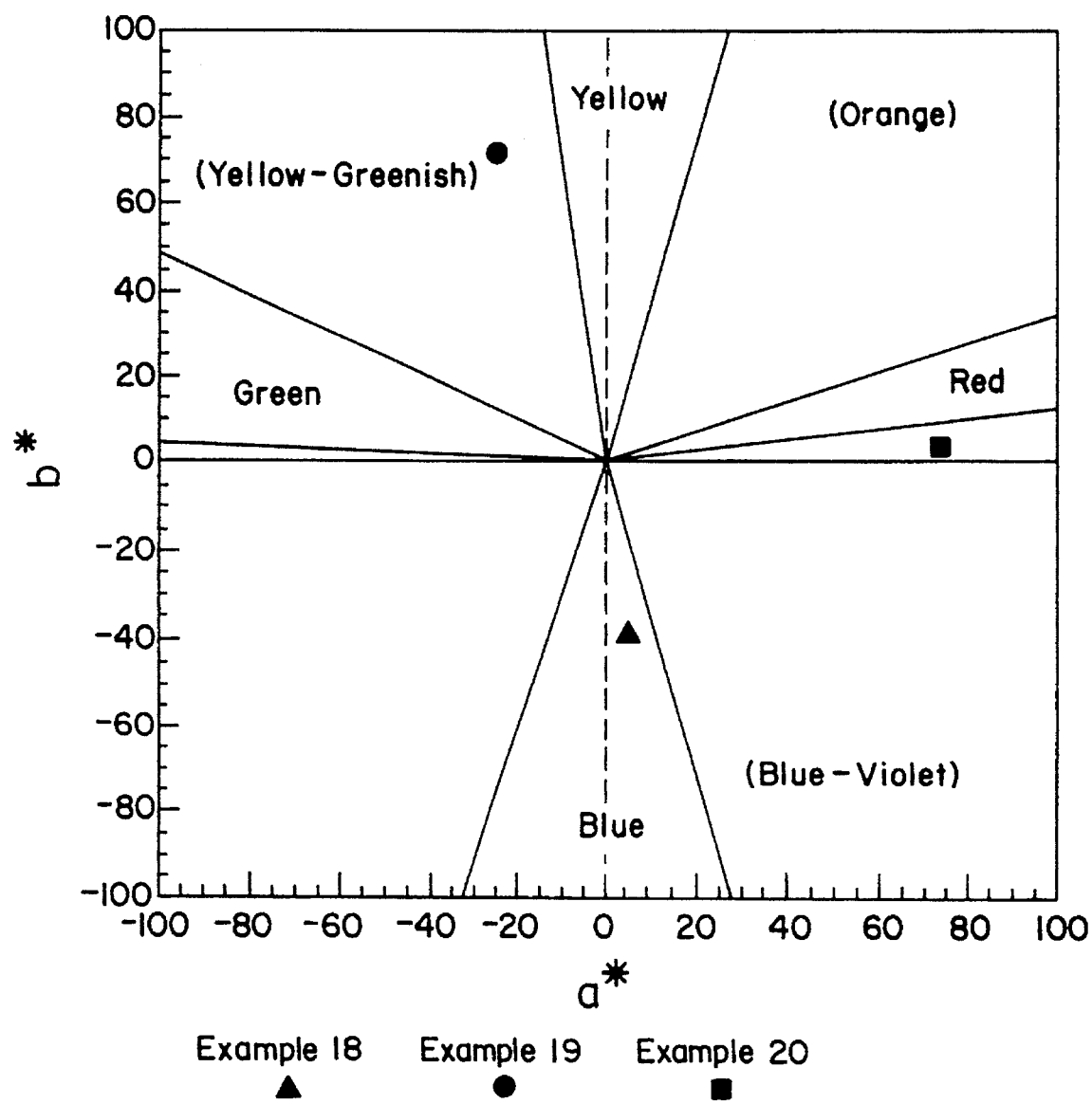
Figure 3:
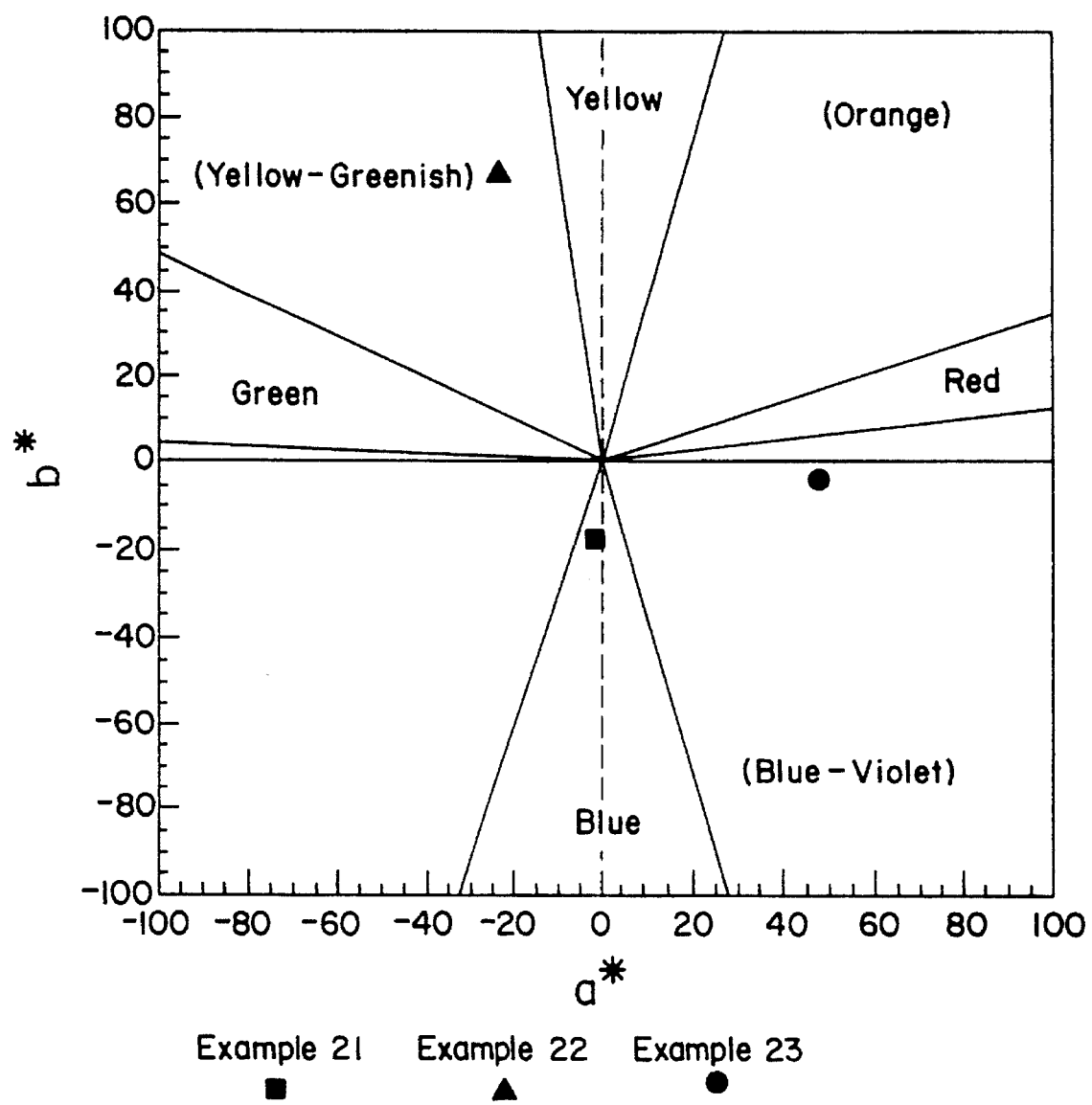
Figure 4:
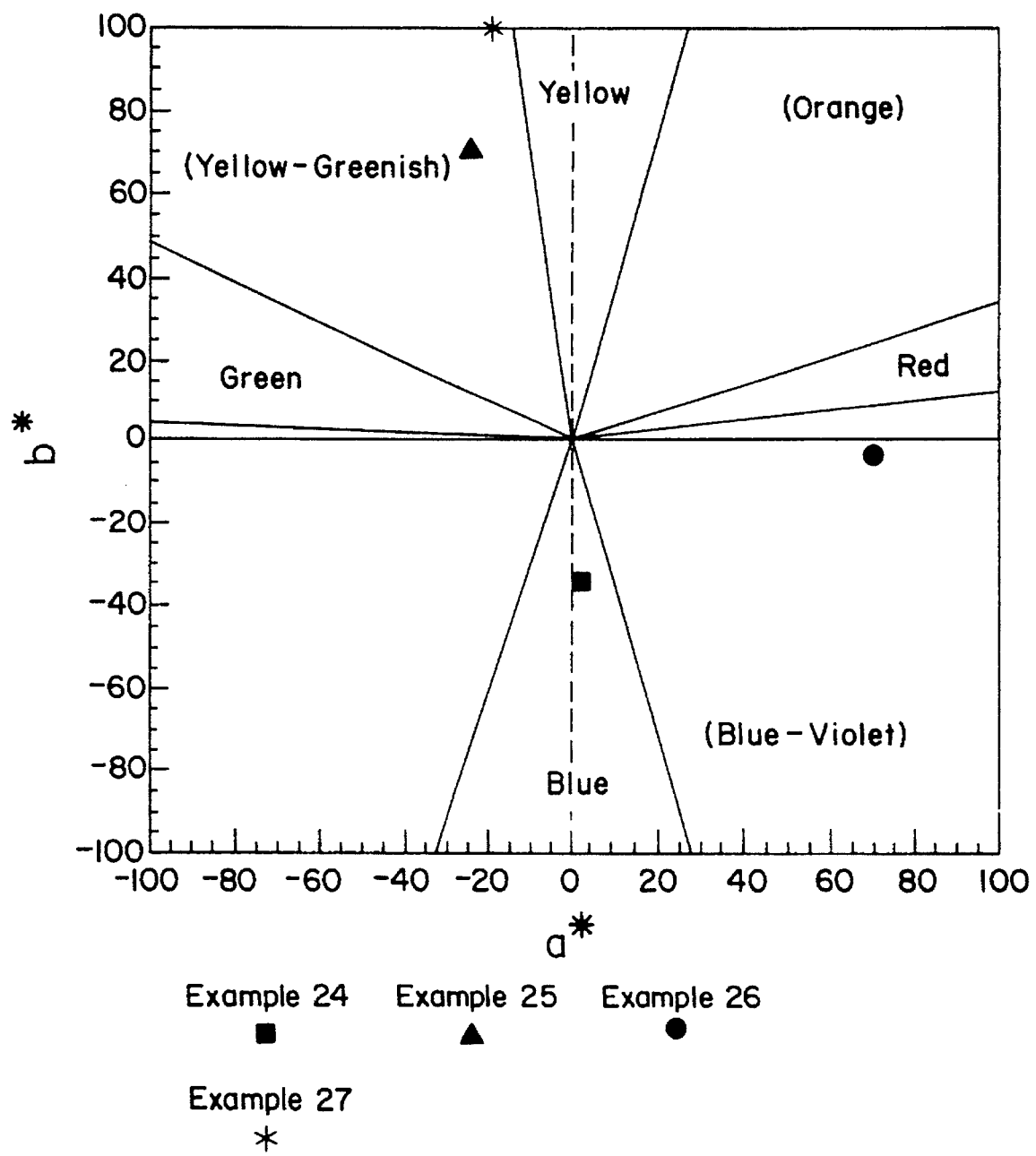

The results of examples 13–27 are shown in the graphics of FIGS. 1,2,3 and 4 enclosed, wherein the pairs of values a* and b* allow a rapid visualization of the shades of each product.

In examples 28 to 34 below, colourless flat plates are prepared.

In particular the preparation of the plates is carried out by adding 1,1-di(terbutylperoxy)-3,3,5-trimethylcyclo hexane, as initiator, to the allyl carbonate, in a quantity of 2.5% by weight in the mixture. The compositions containing the catalyst are transformed by polymerization into flat plates with a thickness of 3 mm by the conventional casting technique. According to this technique the liquid composition containing the catalyst is poured into the cavity of a mould composed of two glass elements, with a spacing seal of plasticized polyvinyl chloride or copolymer of ethylene-vinyl acetate (EVA). The liquid composition is polymerized by thermal treatment carried out in an oven with forced circulation, according to the following program: 85° C. for 7 hours, 90° C. for 16 hours and 100° C. for 7 hours. At the end of this treatment, the moulds are opened, the polymerized products are removed and are maintained at 110° C. for a further 2 hours, to decompose any possible residuous initiator and relax any possible internal tension.

The following characteristics are determined on the plates thus obtained:

a) Optical characteristics:
  Refractive Index ($n_D^{20}$): measured with an Abbe refractometer (ASTM D-542);
  Haze and Transmittance in visible range (%): measured using a Hazegard XL-211 device of Gardner (ASTM D-1003);
  Yellowness index (YI) (ASTM D-1925) defined as:

$$YI = \frac{100}{Y}(1.277X - 1.06Z)$$

determined with a MACBETH 1500 Plus spectrophotometer.
b) Physical and mechanical characteristics:
  Density: determined with a hydrostatic balance at a temperature of 20° C. (ASTM D-792);
  Volume contraction during polymerization (Shrinkage), calculated with the following formula:

$$\text{Shrinkage \%} = \frac{(\text{polymer density} - \text{monomer density})}{(\text{polymer density})} \times 100$$

Rockwell Hardness (M) measured with a Rockwell durometer (ASTM D-785);
  Izod Impact Strength (ASTM D-256 unnotched).
  Heat distortion temperature (° C.) under load 1.82 MPa (HDT) (ASTM D-648).

EXAMPLE 28

A polymerizable liquid composition containing 97.5% by weight of allyl carbonate A1 and 2.5% by weight of 1,1-di(terbutylperoxy)-3,3,5-trimethyl cyclohexane is prepared and polymerization is carried out by casting under the conditions described above. The plates obtained are perfectly polymerized, transparent and without optical defects and have the following characteristics:

| | |
|---|---|
| $n_D^{20}$ | 1.4894 |
| Haze (%) | 0.17 |
| Transmittance (%) | 92.6 |
| YI | 1.80 |
| Density, 20° C. | 1.2105 |
| Shrinkage (%) | 9.5 |
| Rockwell Hardness, M | 100 |
| Izod (KJ/m$^2$) | 6.7 |
| HDT (°C.) | 72.5 |

EXAMPLE 29

A polymerizable liquid composition containing 97.5% by weight of allyl carbonate A2 and 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.4948 |
| Haze (%) | 0.18 |
| Transmittance (%) | 92.5 |
| YI | 2.3 |
| Density, 20° C. | 1.2485 |
| Shrinkage (%) | 8.6 |
| Rockwell Hardness, M | 105 |
| Izod (KJ/m$^2$) | 17.3 |
| HDT (°C.) | 76 |

EXAMPLE 30

A polymerizable liquid composition containing 97.5% by weight of allyl carbonate A3 and 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.5010 |
| Haze (%) | 0.22 |
| Transmittance (%) | 91.4 |
| YI | 4.6 |
| Density, 20° C. | 1.2910 |
| Shrinkage (%) | 8.5 |
| Rockwell Hardness, M | 116 |
| Izod (KJ/m$^2$) | 10.7 |
| HDT (°C.) | 100 |

EXAMPLE 31

A polymerizable liquid composition containing 97.5% by weight of a mixture of allyl carbonates A2 and A8 (ratio by weight 70/30) and 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.4925 |
| Haze (%) | 0.3 |
| Transmittance (%) | 92.2 |

| | |
|---|---|
| YI | 2.0 |
| Density, 20° C. | 1.2282 |
| Rockwell Hardness, M | 104 |
| Izod (KJ/m$^2$) | 6.3 |
| HDT (°C.) | >130 |

EXAMPLE 32

A polymerizable liquid composition containing 97.5% by weight of a mixture of allyl carbonates A2 and A9 (ratio by weight 70/30) end 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.4929 |
| Haze (%) | 0.4 |
| Transmittance (%) | 92.0 |
| YI | 2.9 |
| Density, 20° C. | 1.2426 |
| Rockwell Hardness, M | 117 |
| Izod (KJ/m$^2$) | 6.1 |
| HDT (°C.) | >130 |

EXAMPLE 33

A polymerizable liquid composition containing 97.5% by weight of allyl carbonate A6 and 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.5012 |
| Haze (%) | 0.26 |
| Transmittance (%) | 92.5 |
| YI | 1.87 |
| Density, 20° C. | 1.2882 |
| Shrinkage (%) | 10.3 |
| Rockwell Hardness, M | 96 |
| Izod (KJ/m$^2$) | 19.5 |
| HDT (°C.) | 60 |

EXAMPLE 34

A polymerizable liquid composition containing 97.5% by weight of allyl carbonate A7 and 2.5% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.5030 |
| Haze (%) | 0.22 |
| Transmittance (%) | 92.0 |
| YI | 3.89 |
| Density, 20° C. | 1.3064 |
| Shrinkage (%) | 9.1 |
| Rockwell Hardness, M | 98 |
| Izod (KJ/m) | 30.5 |
| HDT (°C.) | 66 |

In examples 35 and 36 which follow, colourless flat plates are prepared.

In particular the preparation of the plates is carried out by adding 1,1-di(terbutylperoxy)-3,3,5-trimethylcyclo hexane, as initiator, to the allyl carbonate, in a quantity of 2.0% by weight in the mixture. The compositions containing the catalyst are transformed by polymerization into flat plates with a thickness of 3 mm by the conventional casting technique. According to this technique the liquid composition containing the catalyst is poured into the cavity of a mould composed of two glass elements, with a spacing seal of plasticized polyvinyl chloride or copolymer of ethylene-vinyl acetate (EVA). The liquid composition is polymerized by thermal treatment carried out in an oven with forced circulation for 24 hours at 95° C. At the end of this treatment, the moulds are opened, the polymerized products are removed and are maintained at 110° C. for a further 2 hours, to decompose any possible residuous initiator and relax any possible internal tension. On the plates thus obtained, the above described characteristics are evaluated.

EXAMPLE 35

A polymerizable liquid composition containing 98% by weight of allyl carbonate A10 and 2% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.4935 |
| Haze (%) | 0.25 |
| Transmittance (%) | 92.7 |
| YI | 1.60 |
| Density, 20° C. | 1.2483 |
| Shrinkage (%) | 9.0 |
| Rockwell Hardness, M | 105 |
| Izod (KJ/m$^2$) | 22 |
| HDT (°C.) | 101 |

EXAMPLE 36

A polymerizable liquid composition containing 98% by weight of allyl carbonate A7 and 2% by weight of 1,1-di(terbutylperoxy)-3,3,5-trimethyl cyclohexane is prepared and polymerization is carried out by casting under the conditions described above. The plates thus obtained have the following characteristics:

| | |
|---|---|
| $n_D^{20}$ | 1.4930 |
| Haze (%) | 0.30 |
| Transmittance (%) | 92.8 |
| YI | 1.25 |
| Density, 20° C. | 1.2501 |
| Shrinkage (%) | 9.2 |
| Rockwell Hardness, M | 108 |
| Izod (KJ/m$^2$) | 16 |
| HDT (°C.) | >170 |

We claim:

1. A liquid composition which can be polymerized, via radicals, into organic glasses, optionally coloured and/or photochromic, and which includes a polymerizable allyl carbonate, a polymerization initiator capable of generating free radicals under polymerization conditions, and optionally a dye and/or photochromic compound, characterized in that:

(A) said polymerizable allyl carbonate is at least a poly-(allyl carbonate) of an aliphatic $C_3$–$C_{10}$ polyol, linear or branched, or of a cyclo-aliphatic $C_5$–$C_6$ polyol, said polyols containing from 2 to 6 hydroxyl groups in the molecule, said poly(allyl carbonates) being in the form of monomers or mixtures of monomer and relative oligomers;

(B) said polymerization initiator is one compound selected from the group of perketals;

(C) said optional photochromic compound is at least an organic photochromic compound selected from the group consisting of spiropyranes, spiro-oxazines, chromenes and fulgides; and (D) said optional dye is at least an organic dye.

2. Composition according to claim 1, characterized in that said poly(allyl carbonates) (A) are selected from:

bis(allyl carbonates) of diols: diethylene glycol, dipropylene glycol, triethylene glycol, tetraethylene glycol, 1,3-propandiol, 1,4-butandiol, 1,5-pentandiol, 1,6-hexandiol, neopentyl glycol, 3-methyl-1,5-pentandiol, 2-methyl-2-ethyl-1,3-propandiol, 2,2-diethyl-1,3-propandiol, 2,2,4-trimethyl-1,3-pentandiol, 1,4-dimethylolcyclohexane and 4,8-bis(hydroxymethyl)$[5.2.1.0^{2,6}]$ tricyclodecane;

tris(allyl carbonates) of triols: glycerol, trimethylolpropane and tris (hydroxyethyl) isocyanurate;

tetra(allyl carbonate) of pentaerythritol;

hexa(allyl carbonate) of dipentaerythritol;

mixed bis(allyl carbonates) of at least two diols selected from those listed above; and mixed poly(allyl carbonates) of at least one diol and at least one polyol selected from those listed above.

3. Composition according to claim 2, characterized in that said poly(allyl carbonates) are:

(i) bis(allyl carbonate) of diethylene glycol monomer or mixture of monomer and relative oligomers;

(ii) bis(allyl carbonate) of neopentyl glycol monomer or mixture of monomer and relative oligomers;

(iii) mixed poly(allyl carbonate) of diethylene glycol and tris(hydroxyethyl) isocyanurate;

(iv) mixed poly(allyl carbonate) of neopentyl glycol and tris(hydroxyethyl) isocyanurate;

(v) mixed poly(allyl carbonate) of 1,4-butandiol and tris(hydroxyethyl) isocyanurate;

(vi) mixed poly(allyl carbonate) of diethylene glycol and pentaerythritol;

(vii) tris(allyl carbonate) of trimethylol propane; or (viii) tetrakis(allyl carbonate) of pentaerythritol.

4. Composition according to claim 1, characterized in that component (B) is selected from gem-diperoxides:

(II)

wherein: R''' represents a tertiary alkyl group and preferably ter-butyl or ter-amyl; R' and R'' each independently represent an alkyl group, such as methyl, ethyl, propyl and butyl, said alkyl group possibly having non-interfering functional groups, such as for example an alkyl ester group at the extreme end of the chain; or R' and R'' together with the carbon atom to which they are linked, form a cyclo-alkylenic group and preferably a cyclohexylidenic group, possibly having one or more alkyl substituents and preferably from 1 to 3 methyl groups; cyclic gem-diperoxides; and cyclic gem-triperoxides.

5. Composition according to claim 4, characterized in that said component (B) is selected from 2,2-di(terbutyl peroxy) butane; n-butyl 4,4-di(ter-butyl peroxy) valerate; ethyl-3,3-di(ter-butyl peroxy)valerate; 1,1-di (ter-butyl peroxy) cyclohexane; 1,1-di(ter-butyl peroxy) 3,3,5-trimethyl-cyclohexane, 3,3,6,6-tetramethyl-1,2,4,5-tetroxane; 3,6-diethyl-3,6-dimethyl-1,2,4,5-tetroxane; 7,8,15,16-tetraoxadispiro [5.2.5.2]hexadecane; and 3,3,6,6,9,9-hexamethyl 1,2,4,5-tetraoxycyclononane.

6. Composition according to claim 1, characterized in that it contains said component (B) in a quantity of 0.5 to 5.0 parts, preferably from 0.8 to 2.5 parts by weight, every 100 parts by weight of component (A).

7. Composition according to claim 1, characterized in that said component (C) is selected from spiro-oxazines having the formula:

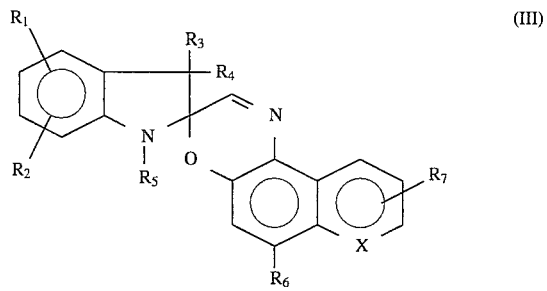

(III)

wherein:

$R_1$, $R_2$ each independently represent a hydrogen atom; a halogen atom (fluorine, chlorine or bromine); or a $C_1$–$C_5$ alkyl group linear or branched; $C_1$–$C_5$ alkoxy group; nitro or cyano group;

$R_3$ and $R_4$ each independently represent a $C_1$–$C_5$ alkyl group linear or branched; phenyl; or benzyl; or $R_3$ and $R_4$ together with the carbon atom to which they are linked form a $C_5$–$C_8$ cyclo-alkyl group;

$R_5$ represents a $C_1$–$C_5$ alkyl group linear or branched, or a similar alkyl group substituted with one or more hydroxy substituent groups, $C_1$–$C_5$ alkoxy or $C_1$–$C_5$ carboxyalkyl groups; phenyl; benzyl; or allyl;

$R_6$ represents a hydrogen atom; a $C_1$–$C_5$ alkyl group linear or branched; or the —$NR_8R_9$ group, wherein $R_8$ represents a $C_1$–$C_5$ alkyl group linear or branched, phenyl, or benzyl, and $R_9$ represents the hydrogen atom, or has the same meaning as $R_8$, or $R_8$ and $R_9$, considered together with the nitrogen atom to which they are linked, form a cyclic structure with from 5 to 12 members, possibly containing a further hetero-atom in the chain selected from oxygen and nitrogen;

$R_7$ represents a hydrogen atom; a halogen atom (fluorine, chlorine or bromine), or a $C_1$–$C_5$ alkyl group linear or branched; a $C_1$–$C_5$ alkoxy group; a cyano group; a nitro group; a sulphide group; a carboxylate ester group with from 1 to 3 carbon atoms in the ester portion; a $C_1$–$C_5$ oxo-alkyl group or a oxo-aryl group; or $R_7$ represents an aromatic ring or a condensed heterocyclic ring; and X represents CH or N.

8. Composition according to claim 7, characterized in that in said formula (III):

$R_1$ and $R_2$ independently represent the hydrogen atom or the methyl group;

$R_3$ and $R_4$ both represent the methyl group or jointly represent the cyclohexyl group;

$R_5$ represents the methyl group;

$R_6$ represents the hydrogen atom or the —$NR_8R_9$ group with groups $R_8$ and $R_9$ which, together with the nitrogen atom to which they are linked, form a structure having a piperidyl, morpholyl, pyrrolidyl or hexamethylenamine ring;

$R_7$ represents the hydrogen atom, a nitro group, or an oxomethyl, oxoethyl or oxyphenyl group; and X represents CH.

9. Composition according to claim 1, characterized in that said component (C) is selected from chromenes having formula:

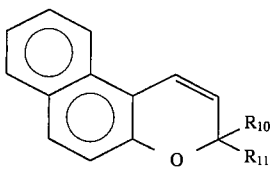

(IV)

wherein $R_{10}$ and $R_{11}$ each independently represent a hydrogen atom, a $C_1$–$C_5$ alkyl group linear or branched, a phenyl group, or a similar phenyl group substituted with from 1 to 5 halogen atoms (fluorine, chlorine or bromine), a cyclopropyl group, or $R_{10}$ and $R_{11}$ jointly represent a $C_5$ or $C_6$ alicyclic group or an adamantane group.

10. Composition according to claim 1, characterized in that it contains said component (C) in a quantity of 0.01 to 0.5 parts by weight and preferably in a quantity of about 0.05 parts by weight for every 100 parts by weight of component (A).

11. Composition according to claim 1, characterized in that said component (D) is selected from those of the following groups: acridine, anthraquinone, azine, monoazo, disazo, metallic azo complexes, perinone, benzoquinone, naphthoquinone, formazane, methine, naphthalamide, nitro, nitroso, phthalocyanine, quinacridone and stilbene.

12. Composition according to claim 11, characterized in that said component (D) is selected from those of anthraquinone, perinone, monoazo, disazo and phthalocyanine.

13. Composition according to claim 1, characterized in that it contains said component (D) in a quantity of 0.005 to 0.1 parts by weight and preferably in a quantity of about 0.02 parts by weight for every 100 parts by weight of component (A).

14. Composition according to claim 1, characterized in that it additionally contains one or more additives selected from stabilizers, such as light stabilizing sterically hindered amines (Hals), lubricants, UV, IR light absorbers and the like, in a global quantity however which does not exceed 1 part by weight for every 100 parts by weight of component (A).

* * * * *